(12) United States Patent
Sethi et al.

(10) Patent No.: US 12,013,949 B2
(45) Date of Patent: Jun. 18, 2024

(54) METHOD AND SYSTEM FOR PERFORMING A LOCAL VULNERABILITY CHECK OF AN APPLICATION UPGRADE TO BE DOWNLOADED BEFORE INITIATING THE UPGRADE

(71) Applicant: Dell Products L.P., Round Rock, TX (US)

(72) Inventors: Parminder Singh Sethi, Ludhiana (IN); Shelesh Chopra, Bangalore (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 17/582,506

(22) Filed: Jan. 24, 2022

(65) Prior Publication Data
US 2023/0237159 A1    Jul. 27, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .. G06F 21/577; G06F 2221/033; G06F 21/57; H04L 63/00
See application file for complete search history.

(56) References Cited

U.S. PATENT DOCUMENTS

| | | |
|---|---|---|
| 9,921,942 B1 | 3/2018 | Makohon et al. |
| 10,158,660 B1 | 12/2018 | Reguly et al. |
| 11,106,784 B2 | 8/2021 | Rosendahl et al. |
| 11,481,498 B2 | 10/2022 | Velur et al. |
| 11,522,899 B2 * | 12/2022 | Somasundaram ...... H04L 63/20 |
| 11,783,062 B2 * | 10/2023 | Lounsberry ......... G06F 21/6218 726/30 |
| 11,880,292 B2 | 1/2024 | Korn |
| 2006/0015941 A1 | 1/2006 | Mckenna |
| 2007/0041663 A1 | 2/2007 | Cho et al. |
| 2013/0347094 A1 | 12/2013 | Bettini et al. |
| 2014/0173737 A1 | 6/2014 | Toback et al. |
| 2014/0196020 A1 | 7/2014 | Shetty et al. |
| 2014/0215450 A1 | 7/2014 | Salisbury |

(Continued)

FOREIGN PATENT DOCUMENTS

EP    2820539 B1    10/2020

*Primary Examiner* — S M A Rahman
(74) *Attorney, Agent, or Firm* — Chamberlain, Hrdlicka, White, Williams, & Aughtry; Aly Z. Dossa

(57) ABSTRACT

In general, embodiments relate to a method for performing a local vulnerability check of an application upgrade to be downloaded, comprising: receiving an application upgrade download request from a client device; sending, by a client device upgrade manager, information related to the application upgrade download request to a local vulnerability validator; determining by the local vulnerability validator, based on impact score information, that a specific version of the application upgrade to be downloaded has vulnerabilities; sending the impact score information to the client device upgrade manager; and notifying, based on the impact score information, the client device that the application upgrade to be downloaded has vulnerabilities.

20 Claims, 5 Drawing Sheets

(56) References Cited

U.S. PATENT DOCUMENTS

| | | |
|---|---|---|
| 2014/0331281 A1* | 11/2014 | Bettini ............... H04L 63/0245 |
| | | 726/1 |
| 2017/0337372 A1 | 11/2017 | Zhang et al. |
| 2018/0189497 A1 | 7/2018 | Sukhomlinov |
| 2019/0079849 A1 | 3/2019 | Korn |
| 2019/0236282 A1 | 8/2019 | Hulick, Jr. |
| 2020/0074084 A1 | 3/2020 | Dorrans et al. |
| 2020/0242254 A1 | 7/2020 | Velur et al. |
| 2021/0014256 A1 | 1/2021 | Malhotra |
| 2021/0173935 A1 | 6/2021 | Ramasamy |
| 2022/0100893 A1 | 3/2022 | Kussmaul |
| 2022/0129561 A1* | 4/2022 | Shivanna ............... G06F 21/57 |
| 2022/0138041 A1 | 5/2022 | Degrass |
| 2022/0156383 A1 | 5/2022 | Schwarzbauer et al. |
| 2022/0350588 A1 | 11/2022 | Liao et al. |
| 2023/0185921 A1 | 6/2023 | Karas |
| 2023/0305828 A1 | 9/2023 | Gujar |

* cited by examiner

METHOD AND SYSTEM FOR PERFORMING A LOCAL VULNERABILITY CHECK OF AN APPLICATION UPGRADE TO BE DOWNLOADED BEFORE INITIATING THE UPGRADE

BACKGROUND

Computing devices in a system may include any number of internal components such as processors, memory, and persistent storage. The computing devices may execute applications (e.g., software). Each application may be upgraded to newer versions to protect the computing devices from security vulnerabilities of the application.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Figure 1:
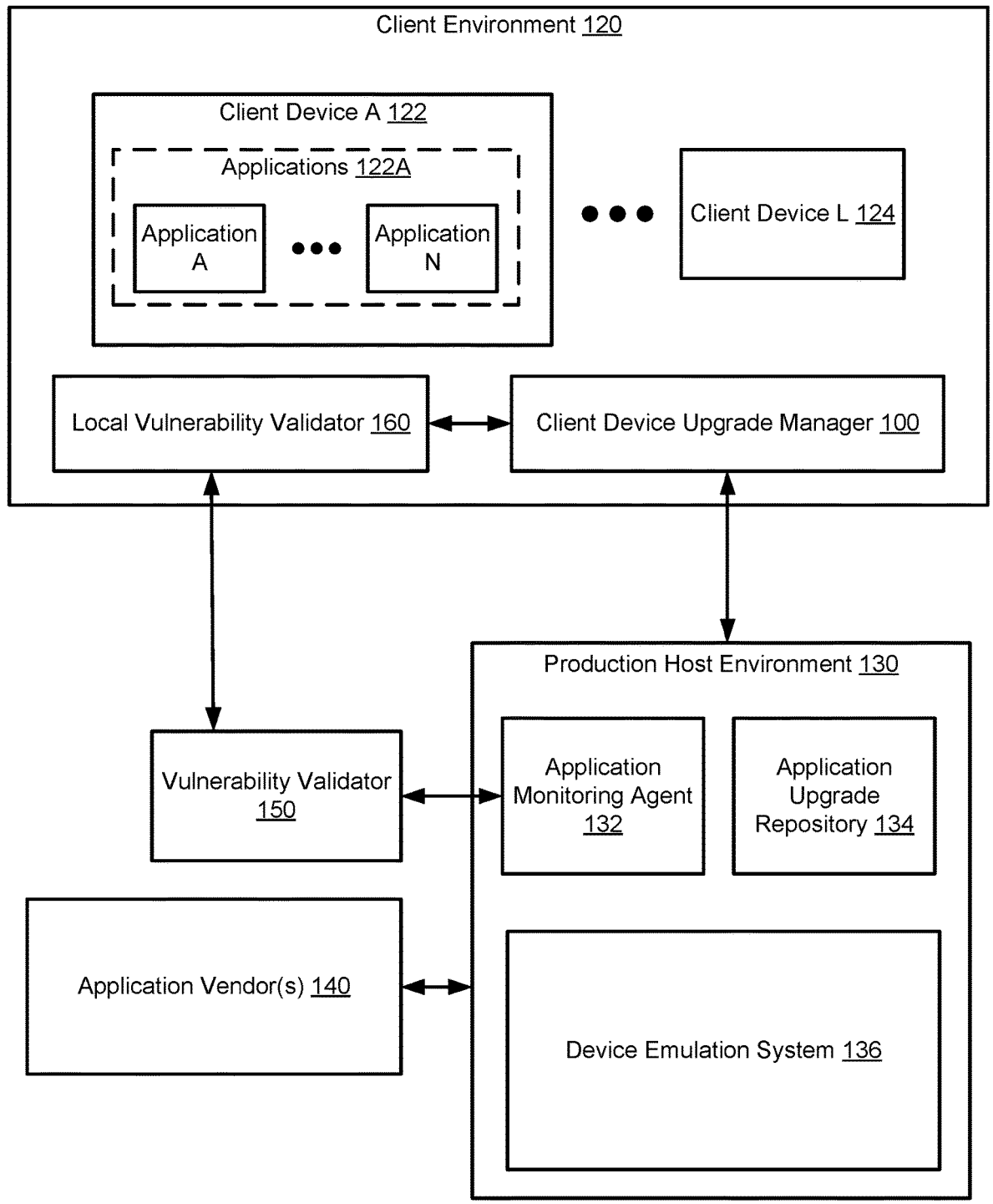
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, a user of a client device (e.g., a computing device) is unaware about whether an application upgrade to be downloaded has vulnerabilities and/or is at risk. Embodiments of the invention relate to a method and system for performing a local vulnerability check of an application upgrade to be downloaded before initiating the upgrade. More specifically, various embodiments of the invention receive an application upgrade download request from a client device and send this information to a local vulnerability validator. Further, various embodiments of the invention, based on impact score information, determine whether a specific version of the application upgrade to be downloaded has vulnerabilities. Based on the impact score information, the client device will be notified whether the application upgrade to be downloaded has vulnerabilities. In one or more embodiments of the invention, by performing the vulnerability validation locally, the client device may be receive a faster response (i.e., a lower latency response) as compared using a remote vulnerability validation service (e.g., a remote vulnerability validator (e.g., 150 in FIG. 1)).

The following describes various embodiments of the invention.

FIG. 1 shows a diagram of a system in accordance with one or more embodiments of the invention. The system includes a client environment (120), one or more application vendors (140), and a production host environment (130). The system may include additional, fewer, and/or different components without departing from the invention. Each component may be operably connected to any of the other component via any combination of wired and/or wireless connections. Each component illustrated in FIG. 1 is discussed below.

In one or more embodiments of the invention, the client environment (120) includes client devices (e.g., 122, 124, etc.) and a client device upgrade manager (100). Each client device (e.g., 122, 124, etc.) may include applications (e.g., 122A). The applications (e.g., 122A) may be logical entities executed using computing resources (not shown) of the client devices (e.g., 122, 124, etc.). Each of the applications may perform similar or different processes. In one or more embodiments of the invention, the applications (e.g., 122A) provide services to users, e.g., clients (not shown). For example, the applications (e.g., 122A) may host components. The components may be, for example, instances of databases, email servers, and/or other components. The applications (e.g., 122A) may host other types of components without departing from the invention. The applications (e.g., 122A) may be executed on one or more client devices (e.g., 122, 124, etc.) as instances of the application.

The applications (e.g., 122A) may be upgraded based on newer versions available for installation. The installation of application upgrades may be performed and/or otherwise initiated by the client device upgrade manager (100). In one or more embodiments of the invention, the client device upgrade manager (100) may periodically collect information (e.g., device state and configuration information, operating system version, application(s) installed, etc.) from the client devices (e.g., 122, 124, etc.) and may send this information to the application vendors (140) for technical support (e.g., recommendations and/or fixes for hardware and/or software failures) to the client devices (e.g., 122, 124, etc.). Further, when there is an application upgrade that is available to fix critical application related issues, the client device upgrade manager (100) may identify the client devices (e.g., 122, 124, etc.) that require the application upgrade and the application vendors (140) may provide a catalog file(s) that specifies the requirements of the identified client device(s) to the production host environment (130).

In one or more embodiments of the invention, the application upgrade repository (134) stores versions of the application upgrade(s). The application upgrade repository (134) may be updated by the application vendors (140) based on the new versions of the application upgrades being available. The application upgrade repository (134) may further include catalog files in order for the application upgrade to be installed. The requirements may include, for example, a compatible device model, a minimum application version for the application upgrade to be installed, a compatible operating system (and corresponding version of such operating system), and an update sequence.

In one or more embodiments of the invention, the client device upgrade manager (100) may obtain application upgrade estimations that specify the required estimated time that the application upgrade may take. The client device upgrade manager (100) may provide the required estimated time for the application upgrade and optimal time slots in which the application upgrade may be performed.

In one or more embodiments of the invention, an application monitoring agent (132) can push the application upgrade(s) to the client device upgrade manager (100). In one or more embodiments of the invention, the application monitoring agent (132) may obtain a list of the client devices (e.g., 122, 124, etc.) that are managed by the client device upgrade manager (100) and the information related to the application(s) installed to those client devices from the client device upgrade manager. In one or more embodiments of the invention, the application monitoring agent (132) may identify a target client device (e.g., 122, 124, etc.) that is compatible with the application upgrade(s) based on the catalog file available in the application upgrade repository (134). Further, in response to a new application upgrade, the application monitoring agent (132) may initiate an estimation of performing the application upgrade on one or more of the client devices (e.g., 122, 124, etc.). The upgrade estimation(s) may be provided to the client device upgrade manager (100).

In one or more embodiments of the invention, the application upgrade may further include functionality for monitoring device configuration information of the client devices (e.g., 122, 124, etc.) such as operating system information, number of applications, current versions of such applications, processing power, memory capability, storage, etc. The device configuration information may be provided to the production host environment (130).

In one or more embodiments of the invention, the applications (e.g., 122A) are implemented as computer instructions, e.g., computer code, stored on a persistent storage that when executed by a processor(s) of a computing device cause the computing device (not shown) to provide the functionality of the applications described throughout this application.

Figure 5:
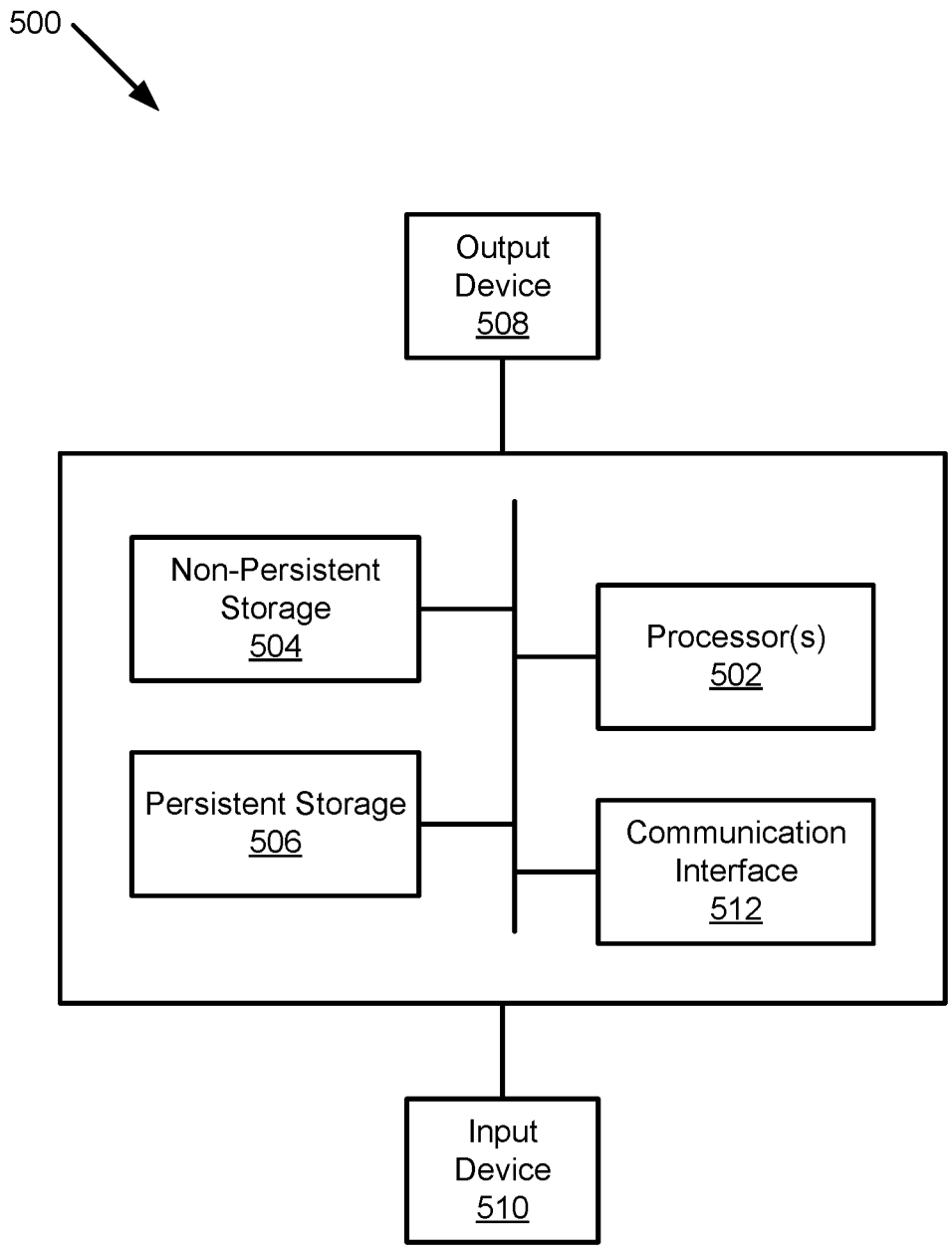
FIG. 5 shows a diagram of a computing device in accordance with one or more embodiments of the invention.

In one or more embodiments of the invention, the client device upgrade manager (100) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application and/or all, or a portion thereof, of the method illustrated in FIG. 3.

In one or more embodiments of the invention, the client device upgrade manager (100) is implemented as a logical device. The logical device may utilize the computing resources of any number of computing devices and thereby provide the functionality of the client device upgrade manager (100) described throughout this application and/or all, or a portion thereof, of the methods illustrated in FIG. 3.

In one or more embodiments of the invention, the production host environment (130) estimates the upgrade times and required reboots to perform the application upgrade(s). The production host environment (130) may include the application monitoring agent (132), the application upgrade repository (134), and a device emulation system (136). The production host environment (130) may include additional, fewer, and/or different components without departing from the invention.

In one or more embodiments of the invention, the application monitoring agent (132) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application and/or all, or a portion thereof, of the method illustrated in FIG. 3.

In one or more embodiments of the invention, the application monitoring agent (132) is implemented as a logical device. The logical device may utilize the computing resources of any number of computing devices and thereby provide the functionality of the application monitoring agent (132) described throughout this application and/or all, or a portion thereof, of the methods illustrated in FIG. 3.

In one or more embodiments of the invention, the device emulation system (136) is a system of device emulation containers that may be configured to emulate the client device (e.g., 122, 124, etc.). The emulation of the client devices may be used for performing the application upgrades on the emulated devices and measuring upgrade metrics such as time taken, number of reboots required, etc. For additional details regarding the device emulation system (136), see, e.g., FIG. 2.

In one or more embodiments of the invention, the device emulation system (136) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application and/or all, or a portion thereof, of the methods illustrated in FIG. 3.

In one or more embodiments of the invention, the device emulation system (136) is implemented as a logical device. The logical device may utilize the computing resources of any number of computing devices and thereby provide the functionality of the device emulation system (136) described throughout this application and/or all, or a portion thereof, of the methods illustrated in FIG. 3.

In one or more embodiments of the invention, the production host environment (130) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, a vulnerability validator (150) may determine vulnerabilities of an application installed to the client device (e.g., 122, 124, etc.). In one or more embodiments of the invention, the vulnerability validator (150) includes a forest tree database (see e.g., FIG. 4), in which the forest tree database may include an impact score information of the application installed and an impact score of a subcomponent(s) of the application installed. Further, the forest tree database may include information related to the application installed such as the application version information of the application installed. Those skilled in the art will appreciate that the invention is not limited to the use of a forest tree database; rather, any data structure may be used by the vulnerability validator without departing from the invention.

In one or more embodiments of the invention, the vulnerability validator (150) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the vulnerability validator (150) described throughout this application.

In one or more embodiments of the invention, the vulnerability validator (150) is implemented as a logical device. The logical device may utilize the computing resources of any number of computing devices and thereby provide the functionality of the vulnerability validator (150) described throughout this application.

In one or more embodiments of the invention, a local vulnerability validator (160) determines vulnerabilities of an application upgrade to be downloaded to the client device (e.g., 122, 124, etc.). In one or more embodiments of the invention, the local vulnerability validator (160) includes a forest tree database (see e.g., FIG. 4), in which the forest tree database includes an impact score information of the application upgrade to be downloaded and an impact score of a subcomponent(s) of the application upgrade to be downloaded. Further, the forest tree database includes information related to the application upgrade to be downloaded such as the application version information of the application upgrade to be downloaded. Additional detail about the operation of the local vulnerability validator (160) is provided below, e.g., in FIG. 4. Those skilled in the art will appreciate that the invention is not limited to the use of a forest tree database; rather, any data structure may be used by the local vulnerability validator without departing from the invention.

In one or more embodiments of the invention, the local vulnerability validator (160) may receive an update from the vulnerability validator (150) (as a global database) and update its forest tree database. The update may be related to the application upgrade to be downloaded. Additionally, the local vulnerability validator (160) may further include functionality for monitoring device configuration information of the client devices (e.g., 122, 124, etc., FIG. 1) and may provide the device configuration information of the client devices to the global database.

In one or more embodiments of the invention, the local vulnerability validator (160) may make decisions (e.g., determining vulnerabilities of the application upgrade to be downloaded to the client device (e.g., 122, 124, etc.)) locally. Additionally, in one or more embodiments of the invention, the local vulnerability validator (160) may include the same or substantially the same content as the vulnerability validator (150). For example, the contents of the local vulnerability validator (160) is sync with the vulnerability validator (150) such that all updates to the forest tree database in the vulnerability validator (150) are reflected in the forest tree database in the local vulnerability validator (160).

With the use of the local vulnerability validator (160), faster (i.e., close to real-time) response to the application upgrade download request from the client device (e.g., 122, 124, etc.) and to the detected vulnerabilities can be provided. In one or more embodiments of the invention, the local vulnerability validator (160) may be slightly out of sync with the vulnerability validator (150) without departing from the invention.

In one or more embodiments of the invention, the local vulnerability validator (160) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the local vulnerability validator (160) described throughout this application.

In one or more embodiments of the invention, the local vulnerability validator (160) is implemented as a logical device. The logical device may utilize the computing resources of any number of computing devices and thereby provide the functionality of the local vulnerability validator (160) described throughout this application.

Figure 2:
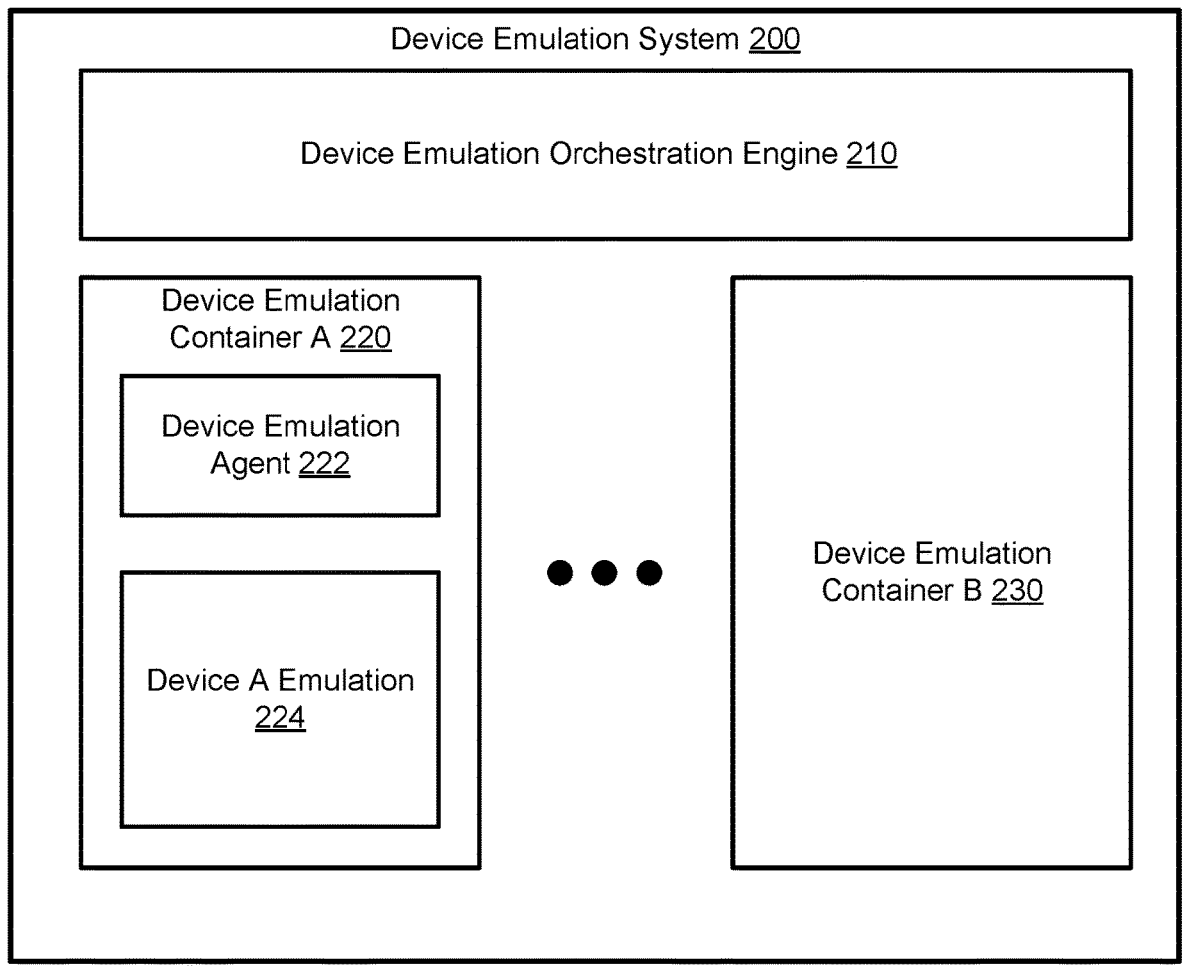
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an embodiment of the device emulation system (e.g., 136, FIG. 1) discussed above, in which the device emulation system emulates the client devices (e.g., 122, 124, etc., FIG. 1). The device emulation system (200) may include a device emulation orchestration engine (210) and one or more device emulation containers (e.g., 220, 230). The device emulation system (200) may include additional, fewer, and/or different components without departing from the invention.

In one or more embodiments of the invention, the device emulation orchestration engine (210) orchestrates the generation of the device emulation containers (e.g., 220, 230). The device emulation orchestration engine (210) may obtain requests to emulate the application upgrade on an emulated device and to provide obtained upgrade estimations to the production host environment (e.g., 130, FIG. 1). The device emulation orchestration engine (210) may initiate the emulation of the devices and the application upgrade(s).

In one or more embodiments of the invention, the device emulation orchestration engine (210) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

In one or more embodiments of the invention, the device emulation orchestration engine (210) is implemented as a logical device. The logical device may utilize the computing resources of any number of computing devices and thereby provide the functionality of the device emulation orchestration engine (210) described throughout this application.

In one or more embodiments of the invention, the device emulation containers (e.g., 220, 230) include a device emulation agent (222) that monitors the application upgrade(s) performed on an emulated device (e.g., 224) of the device emulation container (e.g., 220, 230) to measure the time taken to perform each application upgrade and to track the number of reboots performed during the application upgrade.

This information may then be used to evaluate potential application upgrades and, based on this evaluation, determine whether one or more application upgrades should be push out to the one or more client devices.

Figure 3:
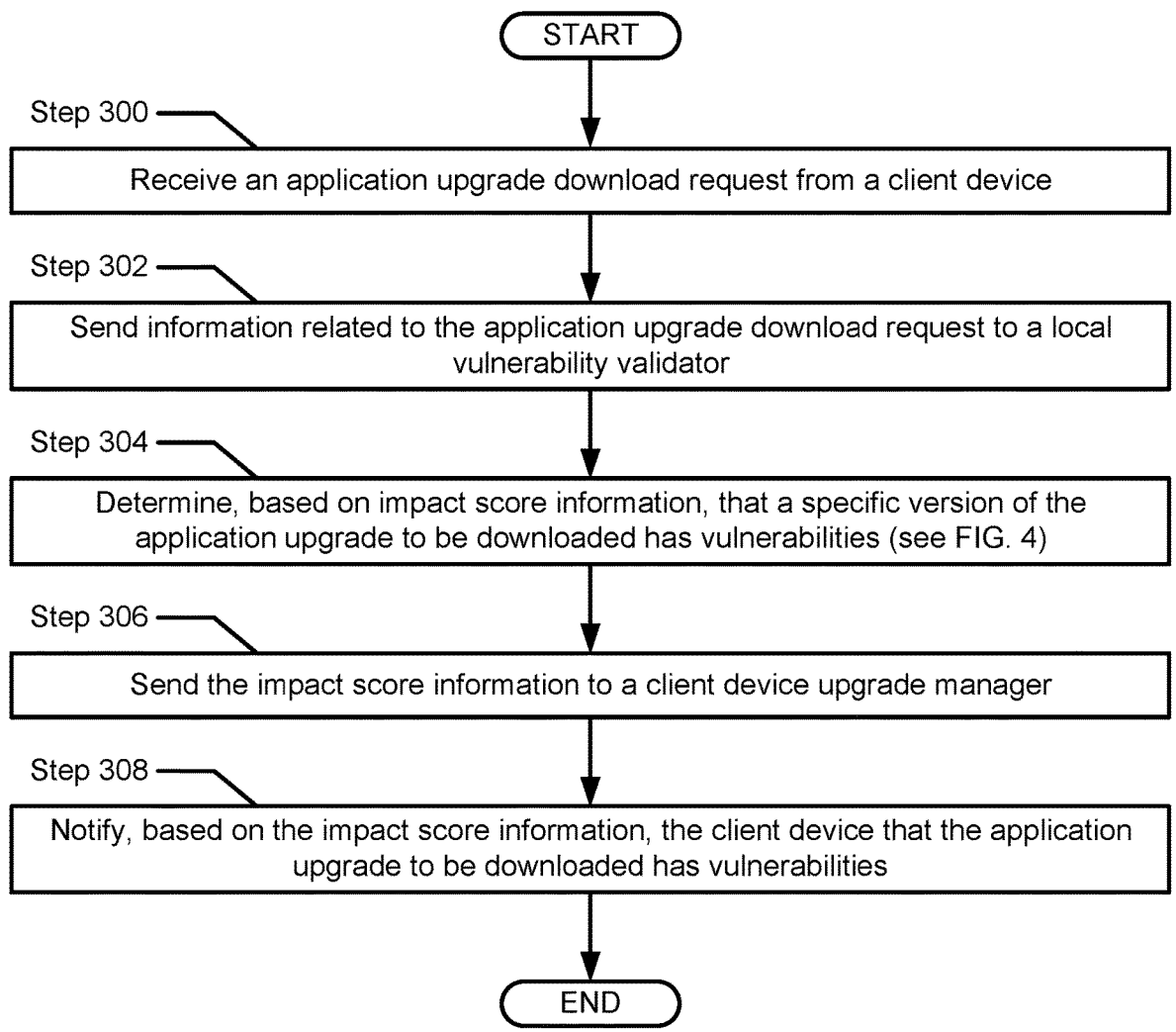
FIG. 3 shows a method to perform a local vulnerability check of an application upgrade to be downloaded in accordance with one or more embodiments of the invention.

FIG. 3 shows a flowchart in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel without departing from the scope of the invention.

Turning now FIG. 3, FIG. 3 shows a method to perform a local vulnerability check of an application upgrade to be downloaded in accordance with one or more embodiments of the invention. The method shown in FIG. 3 may be performed by, for example, the client device upgrade manager (e.g., 100, FIG. 1) and/or the local vulnerability validator (e.g., 160, FIG. 1). Other components of the system illustrated in FIG. 1 may perform the method of FIG. 3 without departing from the invention.

In Step 300, an application upgrade download request from a client device (e.g., 122, 124, etc., FIG. 1) is received. In one or more embodiments of the invention, the client device upgrade manager (e.g., 100, FIG. 1) may receive the application upgrade download request from the client device (e.g., 122, 124, etc., FIG. 1). The device configuration information of the client device (e.g., 122, 124, etc., FIG. 1) may be obtained after receiving the application upgrade download request from the client device.

In one or more embodiments of the invention, the device configuration information of the client device (e.g., 122, 124, etc., FIG. 1) may specify the configuration of a set of client devices that requested the application upgrade. The configuration may be associated with, for example, a current version of the operating system of the client device (e.g., 122, 124, etc., FIG. 1), the number of processors (e.g., central processing unit), the amount of memory available for the client device, a number of applications executing on the client device, and the amount of available persistent storage of the client device. Other configurations may be specified in the device configuration information without departing from the invention.

In Step 302, information related to the application upgrade download request is sent to the local vulnerability validator (e.g., 160, FIG. 1). In one or more embodiments of the invention, the information related to the application upgrade download request may be sent by the client device upgrade manager (e.g., 100, FIG. 1).

In one or more embodiments of the invention, the information related to the application upgrade download request may include, but is not limited to, application version information of an application to be downloaded. The information related to the application upgrade download request may include other details related to the application upgrade to be downloaded without departing from the invention.

Continuing the discussion of FIG. 3, in Step 304, based on impact score information, whether a specific version of the application upgrade to be downloaded has vulnerabilities is determined. In one or more embodiments of the invention, based on impact score information, whether a specific version of the application upgrade to be downloaded has vulnerabilities is determined by the local vulnerability validator (e.g., 160, FIG. 1). When the vulnerabilities are determined, the local vulnerability validator (e.g., 160, FIG. 1) may get in sync with the vulnerability validator (e.g., 150, FIG. 1).

In one or more embodiments of the invention, for example, the information related to the application upgrade download request may specify that client device A has requested to upgrade to version one of application A and client device L has requested to upgrade to version two of the application A. The local vulnerability validator (e.g., 160, FIG. 1) will perform an analysis to calculate the impact score information of each version of the application A requested to upgrade and to determine whether the requested upgrade versions of the application A have vulnerabilities. For additional detail regarding the calculation of the impact score information and the determination process, see, e.g., FIG. 4.

In Step 306, the resulting impact score information from Step 304 is sent to the client device upgrade manager (e.g., 100, FIG. 1).

In Step 308, based on the impact score information received from the local vulnerability validator (e.g., 160, FIG. 1), the client device (e.g., 122, 124, etc., FIG. 1) is notified. In one or more embodiments of the invention, based on the impact score information received from the local vulnerability validator (e.g., 160, FIG. 1), the client device upgrade manager (e.g., 100, FIG. 1) will notify the client device (e.g., 122, 124, etc., FIG. 1) whether the application upgrade to be downloaded has vulnerabilities. The notification specifies the specific application upgrades that include vulnerabilities and, optionally, how to fix the vulnerabilities and/or contact information to contact an entity that can assist in correcting the vulnerabilities.

The method ends following Step 308.

Figure 4:
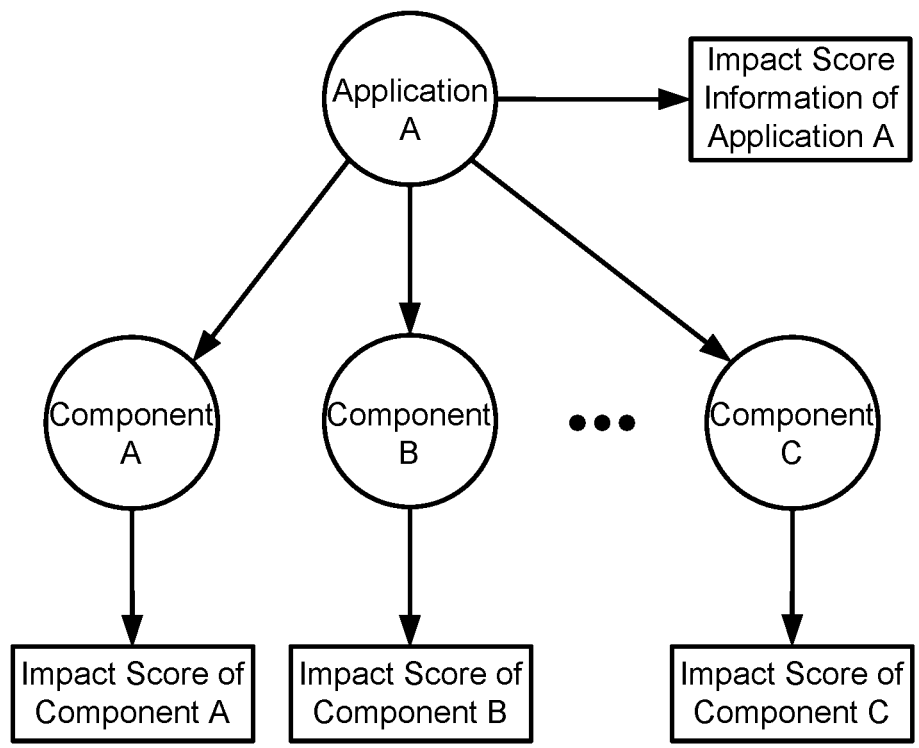
FIG. 4 shows a diagram of a forest tree database in accordance with one or more embodiments of the invention.

Turning now FIG. 4, FIG. 4 shows a diagram of a forest tree database in accordance with one or more embodiments of the invention. In one or more embodiments of the invention, the forest tree database specifies, for a given client device, an application upgrade to be downloaded (e.g., application A) and a subcomponent(s) (e.g., component A, component B, component C, etc.) of the application upgrade to be downloaded. In one or more embodiments of the invention, the subcomponent(s) of the application upgrade to be downloaded include, but are not limited to dynamically linked libraries and/or archive files.

In one or more embodiments of the invention, based on the impact score information (e.g., impact score information of application A), the local vulnerability validator (e.g., 160, FIG. 1) determines whether a specific version of the application upgrade to be downloaded has vulnerabilities. In one or more embodiments of the invention, the local vulnerability validator (e.g., 160, FIG. 1) calculates the vulnerability of the application upgrade to be downloaded based on a scoring system (e.g., common vulnerability scoring system). Further, in one or more embodiments of the invention, while performing the calculation, the local vulnerability validator (e.g., 160, FIG. 1) takes into account one or more impact factor parameters such as attack vector, attack complexity, base score, and base severity.

Those skilled in the art will appreciate that while the above impact factor parameters are taken into account to perform the calculation, any other impact factor parameter may be used to calculate the vulnerability of the application upgrade to be downloaded without departing from the invention.

In one or more embodiments of the invention, the scoring system takes into account the impact score of the subcomponent(s) of the application upgrade to be downloaded to generate the impact score information. For example, in one embodiment of the invention, the impact score of subcomponent A is 90%, the impact score of subcomponent B is 95%, and the impact score of subcomponent C is 75%. The average of the impact score of the subcomponent(s) of the application upgrade to be downloaded is determined and compared against a predetermined impact score information threshold (e.g., less than or equal to 90%). If the average of the impact score of the subcomponent(s) of the application upgrade to be downloaded is below the predetermined impact score information threshold, then the vulnerability validator classifies the application upgrade to be downloaded as having vulnerabilities. For the example discussed above, the average of the impact score of the subcomponent(s) of the application upgrade to be downloaded is 86.7%, which is below the predetermined impact score information threshold and, thus, the application upgrade to be downloaded is classified as having vulnerabilities.

Those skilled in the art will appreciate that while the common vulnerability scoring system is used as the scoring system to calculate the vulnerability of the application upgrade to be downloaded, any other scoring system may be used to calculate the vulnerability of the application upgrade to be downloaded without departing from the invention.

Further, those skilled in the art will appreciate that while the forest tree database is described above with respect to including a single installed application, the forest tree database includes information related to multiple applications and multiple versions of the same application along with their corresponding subcomponents.

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN), such as the Internet, mobile network, or any other type of network) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a local vulnerability check of an application upgrade to be downloaded, the method comprising:
receiving an application upgrade download request from a client device;
sending, by a client device upgrade manager, information related to the application upgrade download request to a local vulnerability validator, wherein the information related to the request comprises device configuration information of the client device,
wherein the device configuration information comprises configurations of a set of client devices that has requested the application upgrade;
determining, by the local vulnerability validator and based on impact score information that is generated using the information related to the request, that a specific version of the application upgrade to be downloaded has vulnerabilities,
wherein the local vulnerability validator performs the determining based on a common vulnerability scoring system,
wherein, when generating the impact score information, the local vulnerability validator further considers a set of impact factor parameters comprising an attack vector and an attack complexity;
sending the impact score information to the client device upgrade manager; and
notifying, based on the impact score information, the client device that the application upgrade to be downloaded has vulnerabilities.

2. The method of claim 1, wherein the local vulnerability validator determines vulnerabilities of the application upgrade to be downloaded.

3. The method of claim 1, wherein the local vulnerability validator comprises a forest tree database, wherein the forest tree database comprises an impact score of a subcomponent of the application upgrade to be downloaded.

4. The method of claim 3, wherein the impact score information is calculated based on the impact score of the subcomponent of the application upgrade to be downloaded.

5. The method of claim 3, wherein the subcomponent of the application upgrade to be downloaded is a dynamically linked library or an archive file.

6. The method of claim 1, wherein the information related to the application upgrade download request further comprises application version information of the application upgrade to be downloaded.

7. The method of claim 1, wherein the local vulnerability validator is in sync with a vulnerability validator.

8. A non-transitory computer readable medium comprising computer readable program code, which when executed by a computer processor enables the computer processor to perform a method, the method comprising:
receiving an application upgrade download request from a client device;
sending, by a client device upgrade manager, information related to the application upgrade download request to a local vulnerability validator, wherein the information related to the request comprises device configuration information of the client device,
wherein the device configuration information comprises configurations of a set of client devices that has requested the application upgrade;
determining, by the local vulnerability validator and based on impact score information that is generated using the information related to the request, that a specific version of the application upgrade to be downloaded has vulnerabilities,
wherein the local vulnerability validator performs the determining based on a common vulnerability scoring system,
wherein, when generating the impact score information, the local vulnerability validator further considers a set of impact factor parameters comprising an attack vector and an attack complexity;
sending the impact score information to the client device upgrade manager; and
notifying, based on the impact score information, the client device that the application upgrade to be downloaded has vulnerabilities.

9. The non-transitory computer readable medium of claim 8, wherein the local vulnerability validator determines vulnerabilities of the application upgrade to be downloaded.

10. The non-transitory computer readable medium of claim 8, wherein the local vulnerability validator comprises a forest tree database, wherein the forest tree database comprises an impact score of a subcomponent of the application upgrade to be downloaded.

11. The non-transitory computer readable medium of claim 10, wherein the impact score information is calculated based on the impact score of the subcomponent of the application upgrade to be downloaded.

12. The non-transitory computer readable medium of claim 10, wherein the subcomponent of the application upgrade to be downloaded is a dynamically linked library or an archive file.

13. The non-transitory computer readable medium of claim 8, wherein the information related to the application upgrade download request further comprises application version information of the application upgrade to be downloaded.

14. The non-transitory computer readable medium of claim 8, wherein the local vulnerability validator is in sync with a vulnerability validator.

15. A system for performing a local vulnerability check of an application upgrade to be downloaded, the system comprising:
a processor of a client device upgrade manager (CDUM) comprising circuitry;
memory of the CDUM comprising instructions, which when executed perform a method, the method comprising:
receiving an application upgrade download request from a client device;
sending information related to the application upgrade download request to a local vulnerability validator (LVV), wherein the information related to the request comprises device configuration information of the client device, wherein the device configuration information comprises configurations of a set of client devices that has requested the application upgrade,
wherein, based on impact score information that is generated using the information related to the request, the LVV determines that a specific version of the application upgrade to be downloaded has vulnerabilities, wherein the LVV performs the determining based on a common vulnerability scoring system, wherein, when generating the impact score information, the LVV further considers a set of impact factor parameters comprising an attack vector and an attack complexity, wherein the LVV sends the impact score information to the CDUM; and notifying, based on the impact score information, the client device that the application upgrade to be downloaded has vulnerabilities.

16. The system of claim 15, wherein the LVV determines vulnerabilities of the application upgrade to be downloaded.

17. The system of claim 15, wherein the LVV comprises a forest tree database, wherein the forest tree database comprises an impact score of a subcomponent of the application upgrade to be downloaded.

18. The system of claim 17, wherein the impact score information is calculated based on the impact score of the subcomponent of the application upgrade to be downloaded.

19. The system of claim 17, wherein the subcomponent of the application upgrade to be downloaded is a dynamically linked library or an archive file.

20. The system of claim 15, wherein the information related to the application upgrade download request further comprises application version information of the application upgrade to be downloaded.

* * * * *